United States Patent
Fukui

(10) Patent No.: US 9,264,315 B2
(45) Date of Patent: Feb. 16, 2016

(54) EVENT GATHERING METHOD, INFORMATION PROCESSING APPARATUS AND EVENT GATHERING SYSTEM

(71) Applicant: FUJITSU LIMITED, Kawasaki-shi, Kanagawa (JP)

(72) Inventor: Masayuki Fukui, Akashi (JP)

(73) Assignee: FUJITSU LIMITED, Kawasaki (JP)

( * ) Notice: Subject to any disclaimer, the term of this patent is extended or adjusted under 35 U.S.C. 154(b) by 49 days.

(21) Appl. No.: 14/471,119

(22) Filed: Aug. 28, 2014

(65) Prior Publication Data

US 2015/0131479 A1    May 14, 2015

(30) Foreign Application Priority Data

Nov. 13, 2013    (JP) ................. 2013-235277

(51) Int. Cl.
| | |
|---|---|
| H04L 12/28 | (2006.01) |
| H04L 12/24 | (2006.01) |
| H04W 4/00 | (2009.01) |
| H04W 16/18 | (2009.01) |
| H04W 88/16 | (2009.01) |

(52) U.S. Cl.
CPC ............... *H04L 41/12* (2013.01); *H04W 4/005* (2013.01); *H04W 16/18* (2013.01); *H04W 88/16* (2013.01)

(58) Field of Classification Search
USPC ......................................... 455/11.1; 709/224
See application file for complete search history.

(56) References Cited

U.S. PATENT DOCUMENTS

| | | | |
|---|---|---|---|
| 7,020,701 B1 * | 3/2006 | Gelvin | G01D 21/00 250/332 |
| 8,824,445 B1 * | 9/2014 | Berenberg | H04W 76/02 370/251 |
| 2008/0098367 A1 | 4/2008 | Partridge et al. | |
| 2009/0034419 A1 * | 2/2009 | Flammer, III | H04L 45/124 370/238 |
| 2013/0201316 A1 * | 8/2013 | Binder | H04L 67/12 348/77 |
| 2013/0232255 A1 | 9/2013 | Fukui et al. | |

FOREIGN PATENT DOCUMENTS

| | | |
|---|---|---|
| JP | 2008-97603 | 4/2008 |
| JP | 2013-47922 | 3/2013 |
| JP | 2013-175133 | 9/2013 |

* cited by examiner

*Primary Examiner* — Duc C Ho

(74) *Attorney, Agent, or Firm* — Staas & Halsey LLP

(57) ABSTRACT

An event gathering method includes: storing cost information between nodes which manages by associating a transmission node identifier and a reception node identifier with a first communication cos, the communication occurring between nodes including a sensor node which transmits an event and an intermediate node which relays the event; modifying or storing the event; gathering cost information between modules which manages by associating a transmission module identifier and a reception module identifier with a second communication cost of a occurred event; extracting a pattern candidate which assigns modules to first nodes as deployment pattern candidates which manages by associating a module identifier with a node identifier; computing a total communication cost based on the cost information between modules and the cost information between nodes; selecting a deployment pattern candidate having the smallest total communication cost; and deploying the modules in the first nodes based on a selected deployment pattern candidate.

12 Claims, 14 Drawing Sheets

FIG. 5

| | TEMPERATURE SENSOR 1 | TEMPERATURE SENSOR 2 | TEMPERATURE SENSOR 3 | TEMPERATURE SENSOR 4 | GW-1 | GW-2 | CLOUD |
|---|---|---|---|---|---|---|---|
| TEMPERATURE SENSOR 1 | | | | | 1 | 3 | 4 |
| TEMPERATURE SENSOR 2 | | | | | 1 | 3 | 4 |
| TEMPERATURE SENSOR 3 | | | | | 3 | 1 | 10 |
| TEMPERATURE SENSOR 4 | | | | | 3 | 1 | 10 |
| GW-1 | 1 | 1 | 3 | 3 | | 2 | 3 |
| GW-2 | 3 | 3 | 1 | 1 | 2 | | 9 |
| CLOUD | 4 | 4 | 10 | 10 | 3 | 9 | |

| | TEMPERATURE SENSOR 1 | TEMPERATURE SENSOR 2 | TEMPERATURE SENSOR 3 | TEMPERATURE SENSOR 4 | GW-1 | GW-2 | CLOUD |
|---|---|---|---|---|---|---|---|
| TEMPERATURE SENSOR 1 | 0 | 2 | 4 | 4 | 1 | 3 | 4 |
| TEMPERATURE SENSOR 2 | 2 | 0 | 4 | 4 | 1 | 3 | 4 |
| TEMPERATURE SENSOR 3 | 4 | 4 | 0 | 2 | 3 | 1 | 6 |
| TEMPERATURE SENSOR 4 | 4 | 4 | 2 | 0 | 3 | 1 | 6 |
| GW-1 | 1 | 1 | 3 | 3 | 0 | 2 | 3 |
| GW-2 | 3 | 3 | 1 | 1 | 2 | 0 | 5 |
| CLOUD | 4 | 4 | 6 | 6 | 3 | 5 | 0 |

EVENT GATHERING METHOD, INFORMATION PROCESSING APPARATUS AND EVENT GATHERING SYSTEM

CROSS-REFERENCE TO RELATED APPLICATION

This application is based upon and claims the benefit of priority from the prior Japanese Patent Application No. 2013-235277 filed on Nov. 13, 2013, the entire contents of which are incorporated herein by reference.

FIELD

The embodiments discussed herein are related to an event gathering method on a network, an information processing apparatus and an information processing system.

BACKGROUND

In a cloud system or a sensor network system, a machine-to-machine (M2M) technology is adopted in which information automatically gathered in a virtual world (cloud) from a device or sensor of a real world are used in various services. For example, information on a device operation situation detected by a sensor incorporated in a device is gathered in the cloud and a remote maintenance is automatically performed based on the device operation information. For example, power consumption information of a device detected by an electric power sensor is gathered in the cloud and an automatic power saving control is performed based on the power consumption information.

A related technique is disclosed in, for example, Japanese Laid-Open Patent Publication No. 2013-47922.

SUMMARY

According to one aspect of the embodiments, an event gathering method includes: storing cost information between nodes which manages by associating a transmission node identifier, which identifies a transmission source node of a communication with a reception destination node, and a reception node identifier, which identifies the reception destination node, with a first communication cost between the transmission source node and the reception destination node, the communication occurring between nodes including a sensor node which transmits an event and an intermediate node which relays the event; modifying or storing the event in a process which gathers the event from the network; gathering cost information between modules which manages by associating a transmission module identifier, which identifies a transmission source module, and a reception module identifier, which identifies a reception destination module, with a second communication cost of a occurred event, the occurred event occurring between the transmission source module and the reception destination module in the modifying or the storing; extracting a pattern candidate which assigns one or more modules to one or more first nodes included in the sensor network as a plurality of deployment pattern candidates which manages by associating a module identifier, which identifies the module, with a node identifier which identifies the first node; computing a total communication cost based on the cost information between modules and the cost information between nodes regarding each of the plurality of deployment pattern candidates; selecting a deployment pattern candidate having the smallest total communication cost from among the plurality of deployment pattern candidates; and deploying the one or more of the modules in the one or more first nodes based on a selected deployment pattern candidate.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 5 is a view illustrating an example of definitions of a cost between nodes;

FIG. 6 is a view illustrating an example of definitions of a cost between nodes;

DESCRIPTION OF EMBODIMENTS

In a cloud system or a sensor network system, an amount of data that flows over the network may be reduced as the number of terminal devices or the number of relay devices (GW (gateway)) increases on a network and as detailed sensor information gathered from a sensor to be transmitted to the cloud increases.

In an effort to suppress the network traffic of the sensor network system, a module capable of modifying event information according to an occurrence situation of an event that flows in each node (device, GW or cloud) of the sensor network, is deployed at a node near a terminal device. Since a processing end event processed in the node near the terminal device is transmitted to the cloud, the network traffic may be suppressed. The event occurrence situation output from a modification module in each node is gathered based on a network topology change such as addition or deletion of a node of a sensor network. A module deployment is activated deploying and executing a module in the node near the terminal device based on the gathered event occurrence situation. A node, on which the event occurred, having the same collection attribute value regarding the event information output from each node is extracted and a module which modifies the event information is deployed at a lowest node which accommodates all the nodes having the same collection attribute value. The network cost (communication cost) and node load between the lower node and the nearest upper node are stored in advance, and the node load or the communication cost is taken into account when a deployment destination of the module is determined.

A communication path of the event which flows in each node of the sensor network is given as a setting. For example, even when the network topology is changed due to, for example, an addition or deletion of the node, an event gathering path which proceeds from a lower node toward an upper node is set. It may be difficult to set the communication path of the sensor network where nodes of the sensor network, of which number is increased as the number of the devices incorporating sensor increases, are communicable with each other each time when the network topology is changed. Therefore, in the sensor network in which respective nodes are communicable with each other, an execution node of the event modification processing module may be controlled so that the cost for the event gathering and modification is minimized and the communication path of the event may be controlled to become an optimum communication path.

Figure 1:
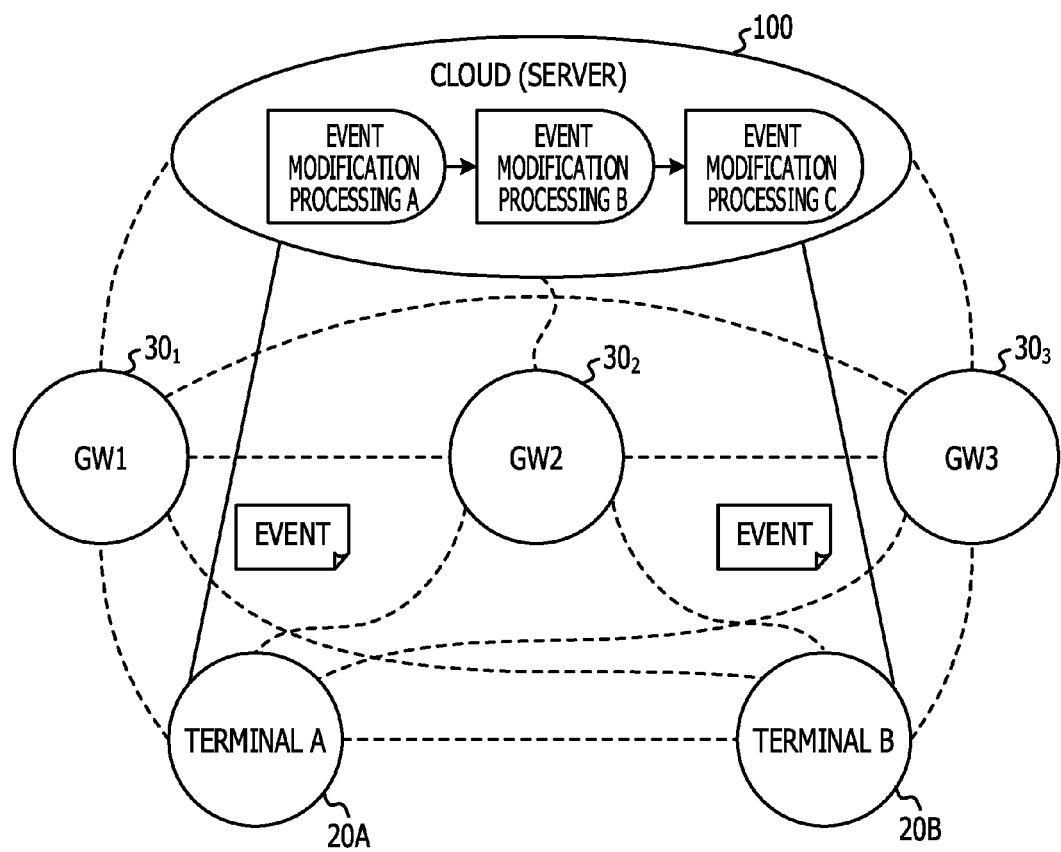
FIG. 1 is a view illustrating an example of a network system.

FIG. 1 is a view illustrating an example of a network system. FIG. 1 illustrates a network system 1 to which an information gathering control is applied. The network system 1 includes terminal devices 20A and 20B (which are collectively referred to suitably as "the terminal 20"), repeaters (GW) $30_1$, $30_2$ and $30_3$ (which are collectively referred to suitably as "repeater 30" or "GW 30") and a server (cloud) 100.

Respective nodes are communicable with each other in the network system 1. The GW 30 of one layer may be disposed between the terminal 20 and the cloud 100 and an upper relay node in which a plurality of GWs 30 are arranged may be disposed.

In the network system 1, the communication path through which an event occurred in the terminal 20 is collected in the server 100 is flexible and the occurred event may be undergone a gathering and modification processing in any GW 30. The result of event processing may be transmitted and received between the GWs 30. The server 100 detects an event modification processing module (a portion of the event modification processing which executes service) and a node, at which the event modification processing module is to be executed, that make an effect of the distributed deployment maximum, thereby determining a forwarding node of the event in an optimum communication path.

In the distributed deployment, the gathering and modification processing of event, for example, a temperature information detected in a temperature sensor, which corresponds to an event modification processing A, B or C which includes a series of event processings that was being performed in, for example, the cloud (server) 100, may be distributively deployed and executed at each node on the sensor network. The terminal 20 transmits the event information detected in the sensor to any of GWs $30_1$, $30_2$ and $30_3$, that are the relay nodes, or directly to the cloud 100 according to the determined optimum communication path.

Figure 2:
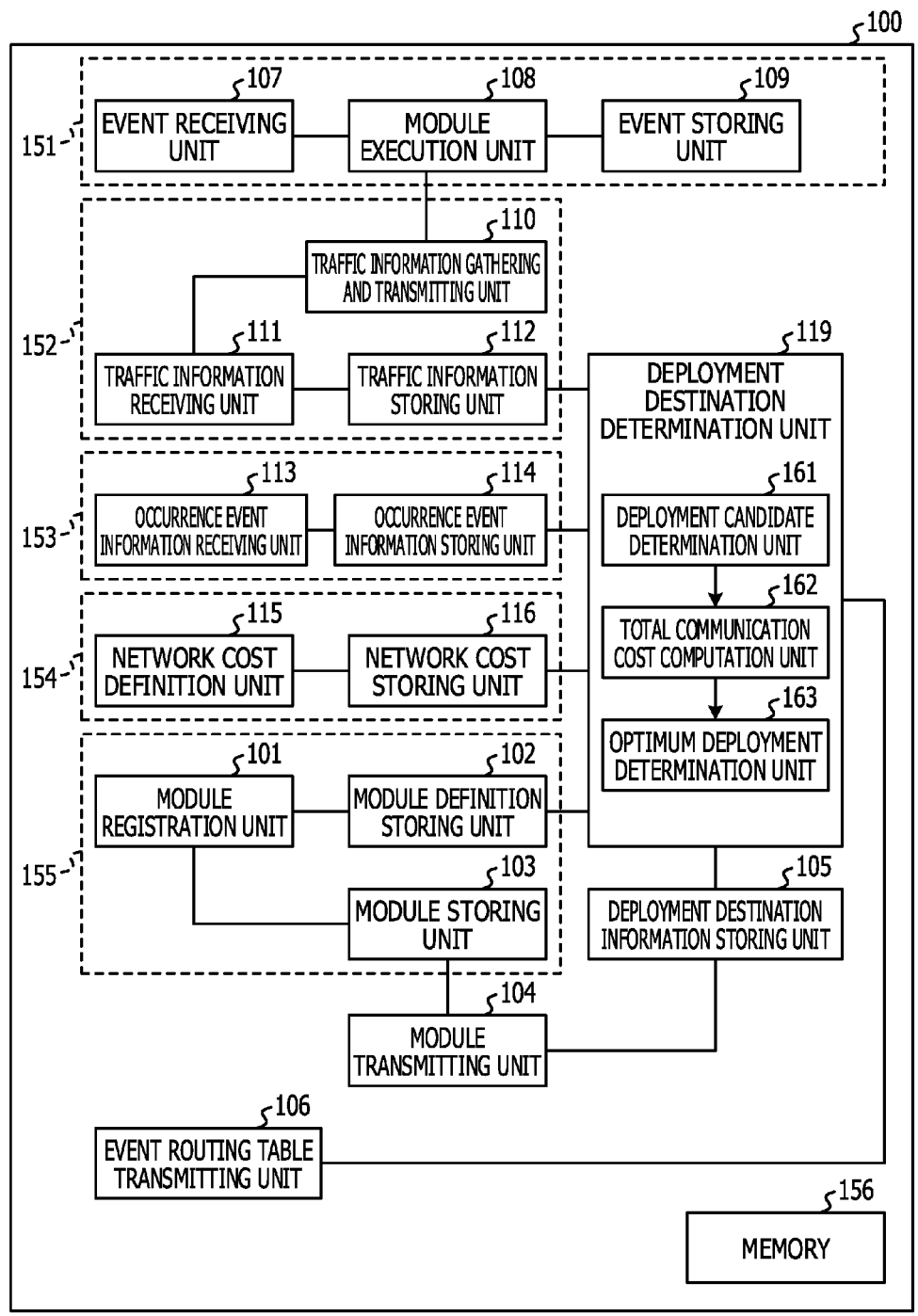
FIG. 2 is a view illustrating an example of a server.

FIG. 2 is a view illustrating an example of a server. FIG. 2 illustrates functional blocks of the server 100 having functionality of an information gathering control. The server 100 modifies and gathers an event detected by the sensor on the sensor network according to a service so as to provide various network services. The server 100 includes an event processing unit 151, a traffic information management unit 152, an occurrence event information management unit 153, a network cost management unit 154, a module management unit 155, a deployment destination determination unit 119, a deployment destination information storing unit 105, a module transmitting unit 104 and an event routing table transmitting unit 106. A central processing unit (CPU) may include some or all of these respective units. For example, the CPU may execute an information processing program stored in the memory 156 so that the processing of the server 100 described below may be performed.

The event processing unit 151 includes an event receiving unit 107, a module execution unit 108 and an event storing unit 109. The event receiving unit 107 receives an event from other nodes such as the terminal 20 or the GW 30. The module execution unit 108 stores the received event in the event storing unit 109 and executes the event gathering and modification processing.

Figure 3:
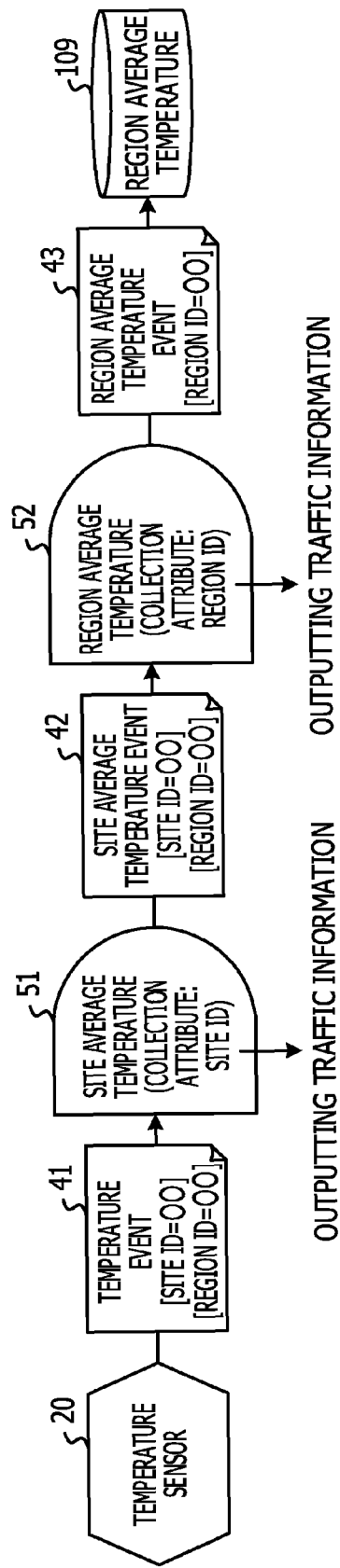
FIG. 3A and FIG. 3B are views illustrating an example of information gathering and modification.

FIG. 3A and FIG. 3B are views illustrating an example of information gathering and modification. FIG. 3A illustrates the event modification processing performed in the module execution unit 108. The module execution unit 108 receives a temperature event 41 occurred in the temperature sensor 20, which corresponds to the terminal 20, through the event receiving unit 107. The module execution unit 108 may receive an event occurred in a single temperature sensor 20 as well as a plurality of temperature sensors 20. The temperature event 41 may include a site ID which indicates a site where the temperature sensor 20 is installed and a region ID which indicates a region where the site is located, and may include a terminal ID as well.

The module execution unit 108 executes the module 51 and refers to the event storing unit 109 to calculate an average temperature (site average temperature) of temperatures obtained from a plurality of the temperature sensors 20 having the same site ID. The "module" may be an application which gathers and modifies an event and an identifier is assigned to each module as illustrated in FIG. 3B. The module 51 outputs the processing result as an output event 42. The output event 42 may be, for example, a site average temperature event. The amount of communication traffic (true cost) needed for transmitting the output event 42 to the next event processing module may be output as the traffic information.

The output event 42 calculated for each site ID is input to the module 52. The output event 42 includes the site ID and the region ID. The module 52 gathers the output event 42 having the same region ID to calculate an average temperature of a region. The calculated region average temperature is output from the module 52 as an output event 43 and stored in the event storing unit 109. The output event 43 includes the region ID and may have, for example, only the region ID. The module 52 outputs the amount of communication traffic (true cost) for transmitting the output event 43 (region average temperature) to the event storing unit 109 as the traffic information.

The traffic information management unit 152 illustrated in FIG. 2 includes a traffic information gathering and transmitting unit 110, a traffic information receiving unit 111 and a traffic information storing unit 112. The traffic information gathering and transmitting unit 110 gathers the traffic information between the event modification processings which are included in a series of event processing flows. The gathered traffic information is stored in the traffic information storing unit 112 by the traffic information receiving unit 111. The traffic information storing unit 112 manages the traffic information for each output event of the processing executed in the module execution unit 108.

The occurrence event information management unit 153 includes an occurrence event information receiving unit 113 and an occurrence event information storing unit 114. The occurrence event information receiving unit 113 receives the occurrence event information from the temperature sensor 20. The occurrence event in the temperature sensor 20 may be a "temperature". When the terminal 20 is a device which incorporates a power meter, an event type of the occurrence event may be, for example, "power consumption". The event type may differ for each service to be executed.

The occurrence event information storing unit 114 stores information regarding the occurrence event to manage which event occurs in each node such as the terminal 20 or the GW 30. When an addition or deletion of the terminal 20 or the GW 30 occurred, the occurrence event information stored in the occurrence event information storing unit 114 is updated. When the occurrence event information is updated, the traffic information which indicates the true cost between the event modification processings is also changed and thus, the traffic information is also updated.

The network cost management unit 154 includes a network cost definition unit 115 and a network cost storing unit 116. The network cost definition unit 115 receives a definition of the network cost between the nodes. The network cost storing unit 116 maintains information of the network cost between the nodes received in the network cost definition unit 115.

Figure 4:
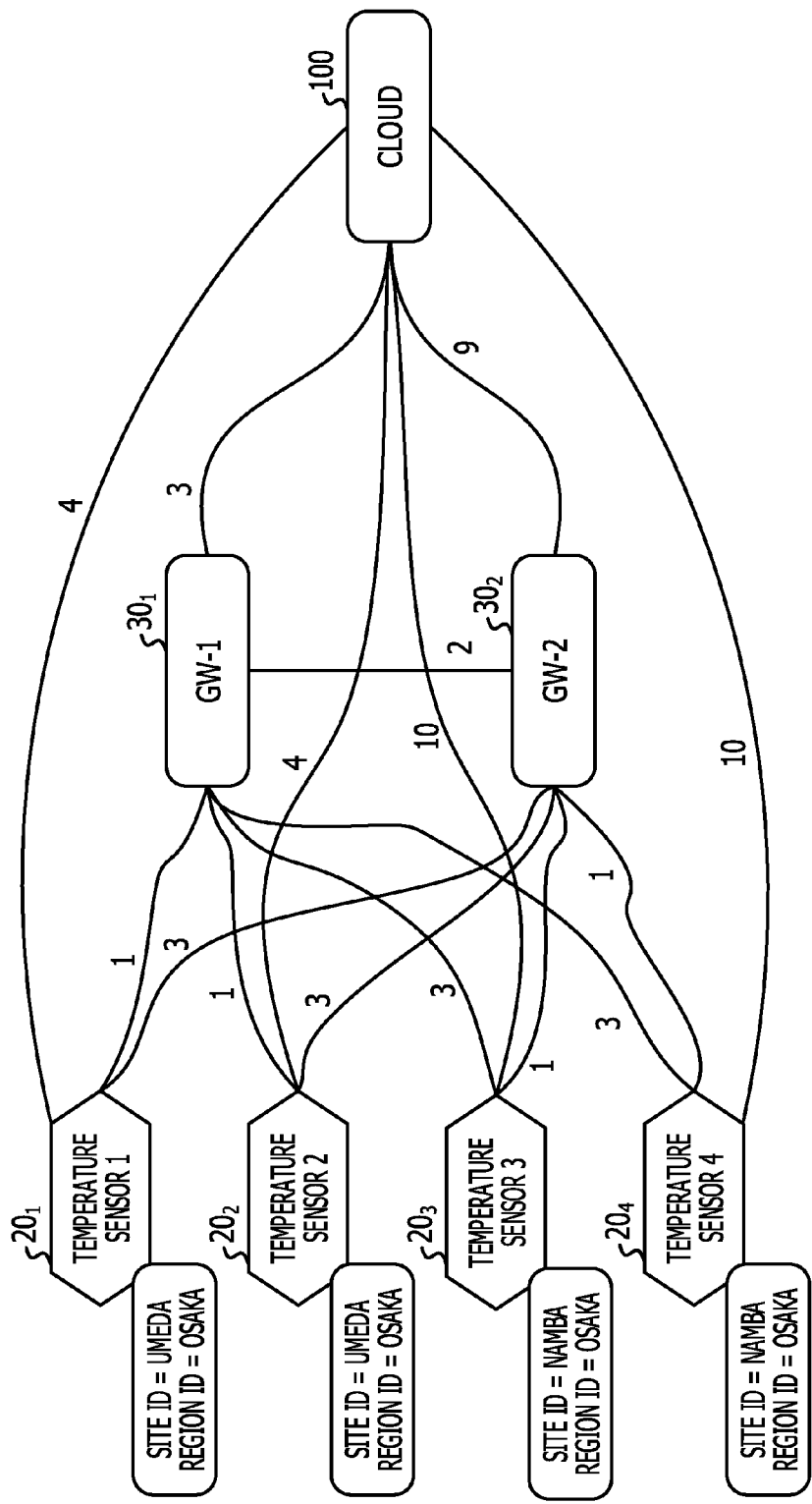
FIG. 4 is a view illustrating an example of definitions of a cost between nodes.

FIG. 4, FIG. 5 or FIG. 6 is a view illustrating an example of a definition of cost between nodes. The cost between nodes may be, for example, a communication cost per unit of communication traffic amount or a communication cost per unit time. In FIG. 4, two GWs $30_1$ and $30_2$ are disposed between the temperature sensors $20_1$, $20_2$, $20_3$, and $20_4$ and the cloud (server) 100 and thus, intercommunication between the GWs 30 or direct communication between the GW 30 and the cloud 100 may be performed. The temperature sensor $20_1$ and the temperature sensor $20_2$ may be installed at a different location of the site to which the same site ID is assigned. The temperature sensor $20_3$ and the temperature sensor $20_4$ may be installed at the different location of the site which is specified by the site ID. Each temperature sensor 20 is communicable with any GW 30 and is also directly communicable with the cloud (server) 100.

In FIG. 5, the definition of the cost between nodes illustrated in FIG. 4 is represented as a matrix 121. The matrix 121 defines the network cost between the nodes that are directly communicable with each other. The matrix 121 may define the network costs between all the nodes that are directly communicable with one another.

In FIG. 6, the cost between nodes for a case where the smallest cost path search is performed based on the matrix 121 illustrated in FIG. 5 is represented in the matrix 122. The matrix 122 may be prepared using a known algorithm such as a Dijkstra's algorithm or a Bellman-Ford algorithm.

For example, the intercommunication between the terminals (temperature sensors) 20 through any GW 30 may be performed without allowing the direct communication between the terminals. The direct communication as well as the communication through the GW 30 may be performed between the terminal (temperature sensor) 20 and the cloud (server) 100. When it is determined from a result of the smallest cost path search that the communication cost of the communication between the terminal and the cloud through the GW 30 is relatively lower, a path having a lower communication cost may be selected.

For example, when the direct communication of FIG. 5 is adopted, the cost between the nodes is "10" in a path between the temperature sensor 3 and the cloud 100 or in a path between the temperature sensor 4 and the cloud 100. For example, by passing the node GW-1, the cost between the nodes becomes "6" as illustrated in FIG. 6. For example, when the direct communication between the GW-2 and the cloud is adopted, the cost between the nodes is "9", but GW-1 is used in the communication between the GW-2 and the cloud based on the smallest cost path search so that the cost between the nodes becomes "5".

The network cost definition unit 115 stores the network cost definition in a matrix 121 type or a matrix 122 type in the network cost storing unit 102. When the network cost definition is stored in the matrix 121 type, an optimum cost between the nodes based on the shortest path search may be calculated upon computation of the total communication cost, so that the calculated optimum cost between the nodes may be used.

The module management unit 155 illustrated in FIG. 2 includes a module registration unit 101, a module definition storing unit 102 and a module storing unit 103. The module registration unit 101 registers the module that is executed by the server 100 and stores the definition of the registered module in the module definition storing unit 102. The module registration unit 101 stores the registered module in the module storing unit 103.

The module definition storing unit 102 may include, for example, a module definition table 102T illustrated in FIG. 3b. An identifier is assigned to each module and thus a processing logic is defined. For example, an input event type, a collection attribute name or an output event type may be defined regarding each of the "site average temperature" module and the "region average temperature" module.

The deployment destination determination unit 119 determines which event modification processing module is to be distributively deployed at which node based on the traffic information, the occurrence event information, the network cost definition and the module definition. The network cost definition may define the communication costs between all the nodes. The traffic information may be a communication traffic amount of an event occurring between respective event modification processings when a series of event processing flows are executed.

The deployment destination determination unit 119 determines a deployment destination of a module in the following sequence.

(1) Deployment Candidate Extraction

The deployment candidate determination unit 161 determines a deployment candidate which executes the event processing illustrated in FIG. 3A without inconsistency based on an occurrence event information and a module definition. It is determined whether which event occurs in which terminal (sensor node) 20 based on the occurrence event information stored in the occurrence event information storing unit 114. A module definition table 102T (FIG. 3B) stored in the module definition storing unit 102 is referenced and thus, a node having the same collection attribute name is extracted. The lowest node (e.g., GW 30) which accommodates all the nodes having the same collection attribute name (e.g., site ID) may be extracted as the deployment candidate of a certain module in execution of the module. In a network topology illustrated in FIG. 4, the lowest node which accommodates the temperature sensors 1 and 2 having the same site ID (Umeda) is the GW-1 and the GW-2. The lowest node which accommodates the temperature sensors 3 and 4 having the same site ID (Namba) is the GW-1 and the GW-2.

(2) Computation of Total Communication Cost of Deployment Candidate

The total communication cost computation unit 162 computes the total communication cost for a case where the event modification processing module is deployed and executed in a deployment candidate node. The total communication cost is a total of values obtained by multiplying the cost between nodes by the amount of communication traffic between the event modification processings ((cost between nodes)×(true cost)). The cost between the nodes is acquired from the network cost definition stored in the network cost storing unit 116. The network cost may be defined in a type of the matrix 121 illustrated in FIG. 5 or the matrix 122 illustrated in FIG. 6. The cost between nodes used for calculating the total communication cost may be the cost between the nodes after the smallest cost path search is performed. The cost between the nodes according to a path via the GW-1 having a lower cost between the deployment candidates GW-1 and GW-2 is selected from the matrix 122. The true cost between the event modification processings is acquired from the traffic information stored in the traffic information storing unit 112.

(3) Determination of an Optimum Distributed Deployment Pattern

The optimum deployment determination unit 163 compares the total communication cost calculated in the total communication cost computation unit 162 with the total communication cost in the current distributed deployment pattern to determine a deployment pattern having a lower cost as an optimum distributed deployment pattern.

When a new distributed deployment pattern is determined as the optimum pattern, information of the deployment destination information storing unit 105 is updated. The module transmitting unit 104 transmits the event modification processing module to a node which becomes a deployment candidate according to the determined distributed deployment pattern. The event routing table transmitting unit 106 transmits the event routing table to each node according to the determined distributed deployment pattern. The event routing table may be information indicating that an event occurring in each terminal 20 and each GW 30 should be transmitted to which node.

When the current distributed deployment pattern is determined as the optimum pattern by the optimum deployment determination unit 163, the current distributed deployment pattern is maintained. After determination of the optimum distributed deployment pattern and execution of the deployment, other deployment candidate is extracted in the above-mentioned processing (1) and the optimum distributed deployment pattern is determined and deployed again in order to generate a distributed deployment pattern with which the cost is further lowered. As described above, the optimum distributed deployment having the smallest total communication cost may be executed based on the cost between the nodes in the sensor network.

Figure 7:
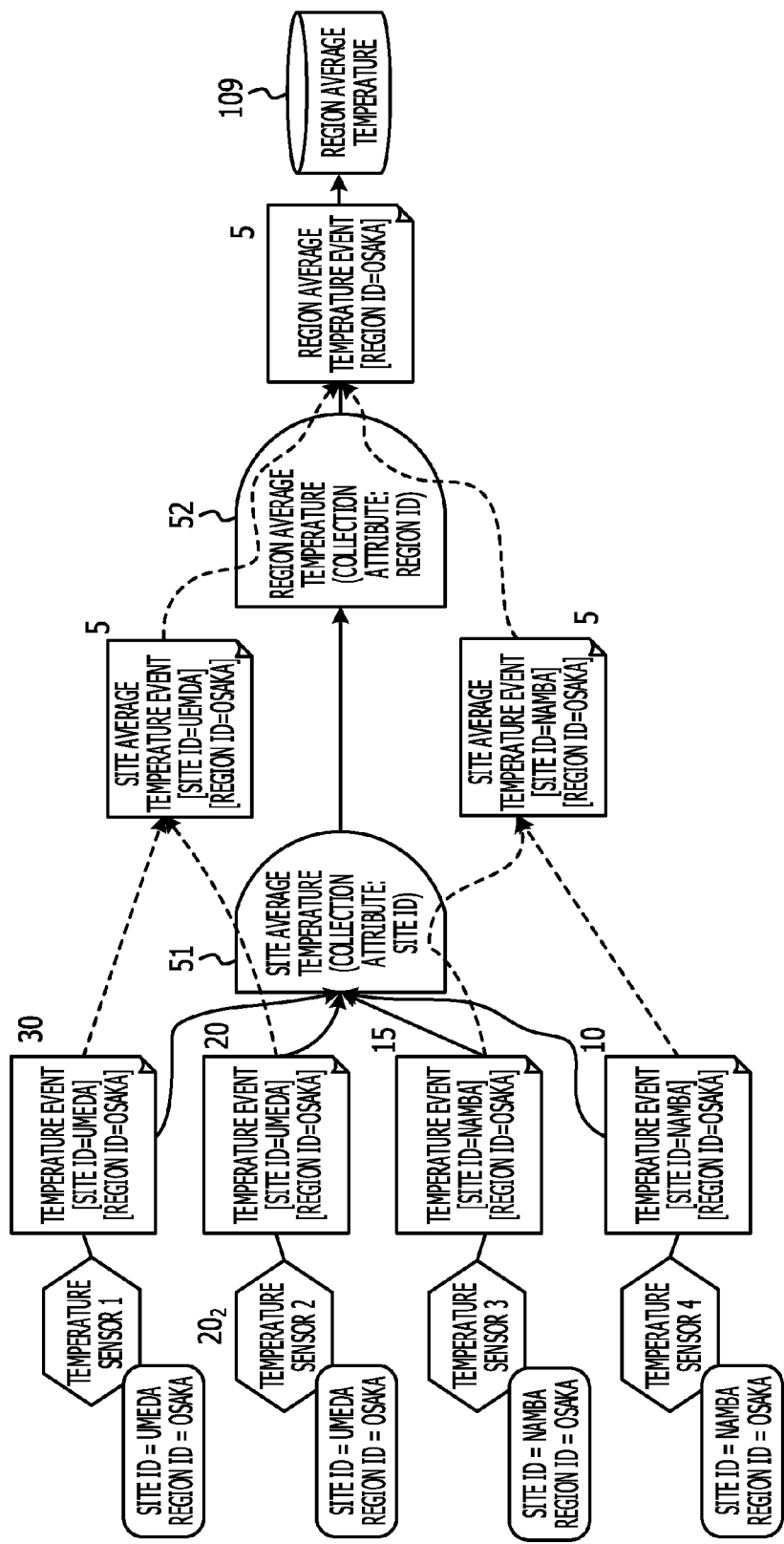
FIG. 7 is a view illustrating an example of a traffic calculation.

FIG. 7 is a view illustrating an example of a traffic calculation. FIG. 7 illustrates a calculation of traffic (true cost) between the event modification processings. For example, an average temperature illustrated in FIG. 3A may be computed. All the average temperature acquisition flows are executed by the module execution unit 108 of the cloud (server) 100 and the communication traffic between events per unit time occurring at that execution is gathered by the traffic information management unit 152.

The amount of communication traffic which occurs at the time when the temperature event occurred in the temperature sensor 1 is transmitted from the temperature sensor 1 to the site average temperature module 51, for the event modification processing which calculates the site average temperature, may be "30". The amount of communication traffic which occurs at the time when the temperature events occurred in the temperature sensors 2, 3 and 4 are transmitted from the temperature sensors 2, 3 and 4 to the site average temperature the module 51, for the event modification processing which calculates the site average temperature, may be "20", "15" and "10", respectively.

The site average temperature for each site ID is obtained in the module 51 and each amount of communication traffic for being transmitted to the module 52 as the site average temperature event may be "5" with respect to each output event, respectively. The amount of communication traffic for sending the region average temperature for each same region ID, which is calculated in the module 52, to a database (event storing unit) 109 may be "5".

Figure 8:
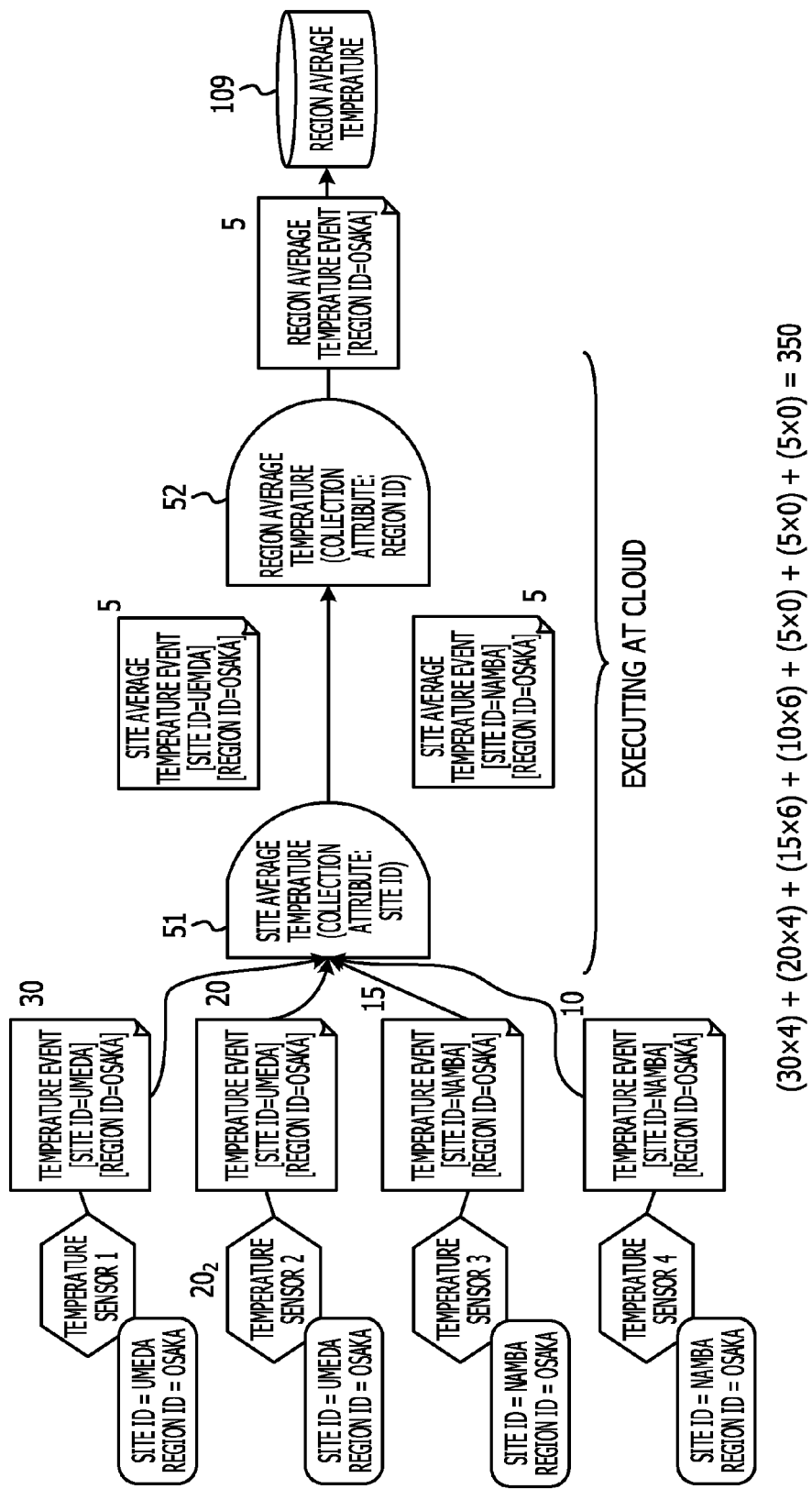
FIG. 8 is a view illustrating an example of a computation of a total communication cost.

FIG. 8 is a view illustrating an example of a computation of a total communication cost. The total communication cost at the time when all the modules are executed in the cloud 100 is computed as an initial value for cost comparison. The computation may be a computation in which total values are computed by multiplying the communication cost between the nodes by the communication traffic (true cost) between the event modification processings, and the computation is executed in the total communication cost computation unit 162 of the deployment destination determination unit 119. The amount of communication traffic between the respective event modification processings computed as illustrated in FIG. 7 may be used as the true cost. The cost between the nodes between each sensor node 20 and the cloud (server) 100 defined by the matrix 122 to which the smallest cost path search is applied may be used as the cost between the nodes.

The first term of the left side "(30×4)" is the cost for transmitting the temperature event occurred at the temperature sensor 1 to the cloud 100 via a shortest path having the lowest cost between the nodes. Each of the second term "(20×4)", third term "(15×6)" and fourth term "(10×6)" is the cost for transmitting each of the temperature events occurred at each of the temperature sensors 2, 3 and 4 to the cloud 100 via a shortest path having the lowest cost between the nodes, respectively.

The fifth term "(5×0)" and sixth term "(5×0)" of the left side are the costs for transmitting the site average temperature event which is the processing result of the module 51 to the module 52 in the same cloud 100. In this case, the cost between the nodes may be zero.

The seventh term "(5×0)" of the left side is the cost for transmitting the region average temperature event which is the processing result of the module 52 to a database (event storing unit) 109 in the same cloud 100. In this case, the cost between the nodes may be zero.

When all the terms are totally summed, the total communication cost becomes 350. The value of the total communication cost may correspond to an initial value of the cost comparison.

Figure 9:
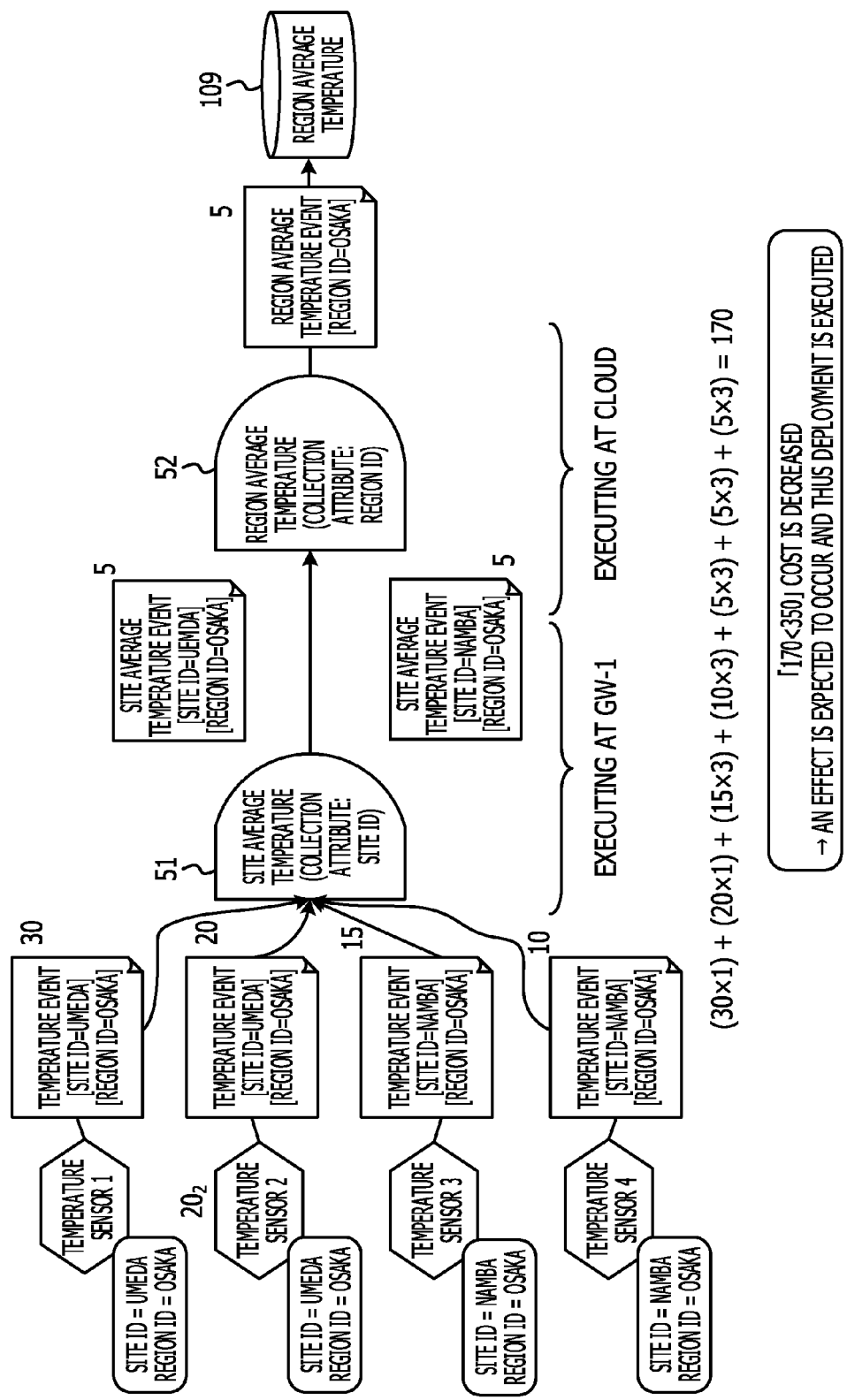
FIG. 9 is a view illustrating an example of a computation of a total communication cost.

FIG. 9 is a view illustrating an example of a computation of a total communication cost. In FIG. 9, a computation of the total communication cost for a case where the GW-1 is selected as the deployment destination candidate node of the site average temperature the module 51 is illustrated. The value of the true cost illustrated in FIG. 7 may be used as the amount of communication traffic between the event modification processings.

The first term of the left side "(30×1)" may correspond to a value obtained by multiplying the communication traffic (true cost) for transmitting the temperature event occurred at the temperature sensor 1 to the GW-1 by the cost between the nodes between the temperature sensor 1 and the GW-1 in the shortest path. Each of the second term "(20×1)", third term "(15×3)" and fourth term "(10×3)" may correspond to a value obtained by multiplying the true cost for transmitting each temperature event occurred at each temperature sensor 2, 3 and 4 to the GW-1 by the cost between nodes between each temperature sensor 2, 3 and 4 and the GW-1 in a path having the smallest cost, respectively.

The fifth term "(5×3)" and sixth term "(5×3)" of the left side are the costs for transmitting the site average temperature event occurred at the GW-1 to the cloud 100 in the shortest path. The seventh term of the left side is the cost for a case where the region average temperature calculated from the site average temperature events collected in the cloud is transmitted to the database 109 within the same cloud 100. In this case, the cost between the nodes may be zero.

A total of first term to seventh term of the left side is 170. When this value is compared with the total communication cost of FIG. 8, the cost for a case where the deployment of the module is changed to a candidate destination is smaller. Therefore, an effect of distributed deployment of the module 51 to the GW-1 is expected and thus, an execution of deployment is determined.

Figure 10:
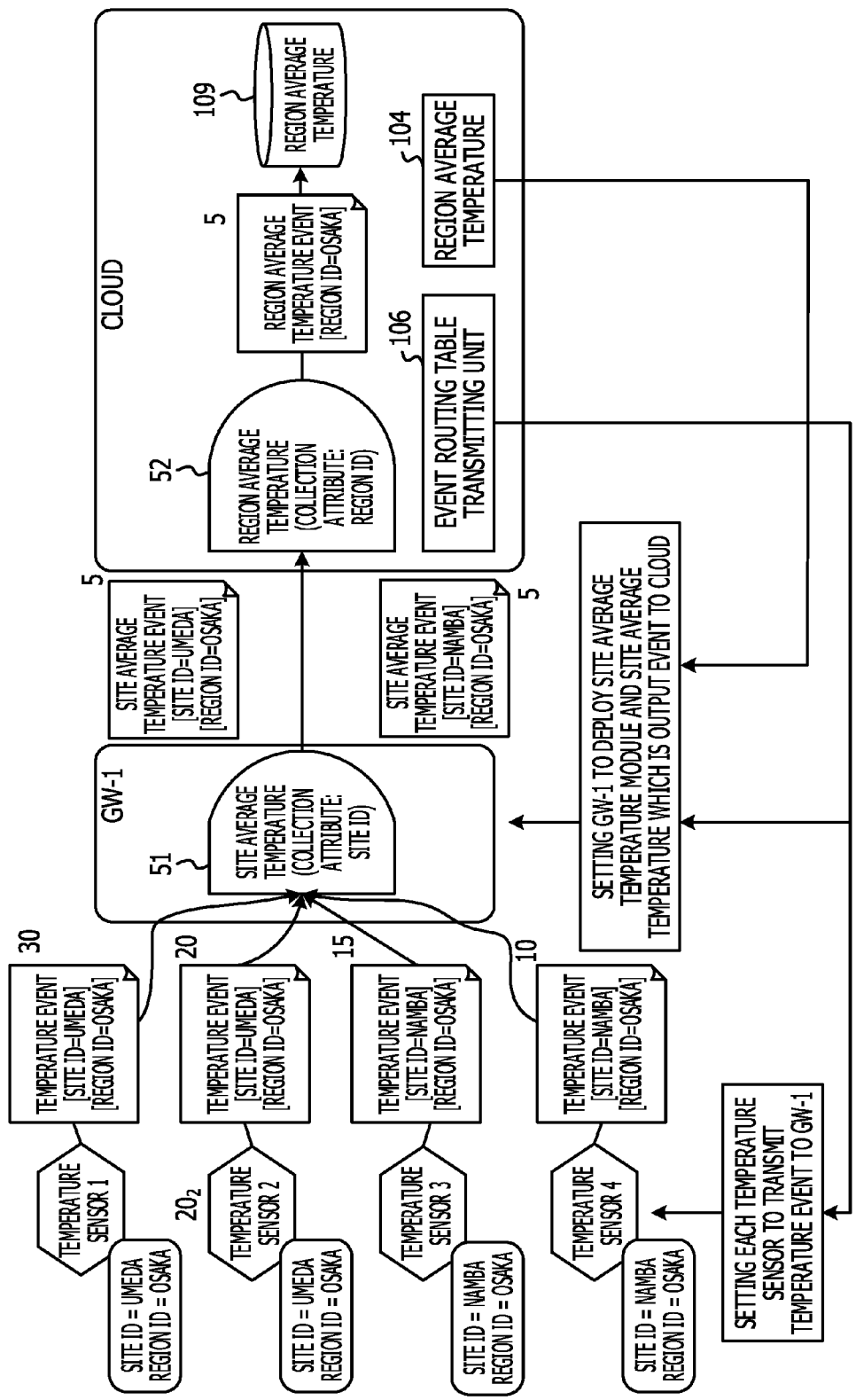
FIG. 10 is a view illustrating an example of an execution of distributed deployment.

FIG. 10 is a view illustrating an example of an execution of distributed deployment. The module transmitting unit 104 of the server 100 transmits the site average temperature of the module 51 to the GW-1 determined as a module deployment destination. The transmitting unit 106 of the server 100 transmits a set request to the respective temperature sensors 1, 2 3 and 4 to transmit the occurred temperature event to the GW-1. Simultaneously, the transmitting unit 106 may transmit a set request to the GW-1 to transmit the site average temperature event, which is the output event, to the cloud (server) 100.

When the distributed deployment is executed, thereafter, the GW-1 gathers the temperature events occurred in the temperature sensors 1, 2, 3 and 4 to execute the module 51 in the gathering path. For example, the site average temperature is obtained for each event group having the same collection attribute (site ID) and the site average temperature is transmitted to the server 100 as an output event. Therefore, information gathering and modification processing may be performed in an optimum path where the total communication cost becomes the lowest cost when determining from the viewpoint of the entire network.

In FIG. 10, the module 51 is deployed in the GW-1 and the module 52 is deployed in the server (cloud) 100, but is not limited to this example. Both the module 51 and the module 52 may be deployed in any one of GWs 30 according to the network topology (cost between nodes) and the true cost between the event modification processings. The module 51 and the module 52 may be deployed in the GW-1 and GW-2, respectively. The module 51 may be deployed in the GW-1 or the GW-2 and the module 52 may be deployed in an upper node disposed between the GW-1 and GW-2 and the cloud 100.

Figure 11:
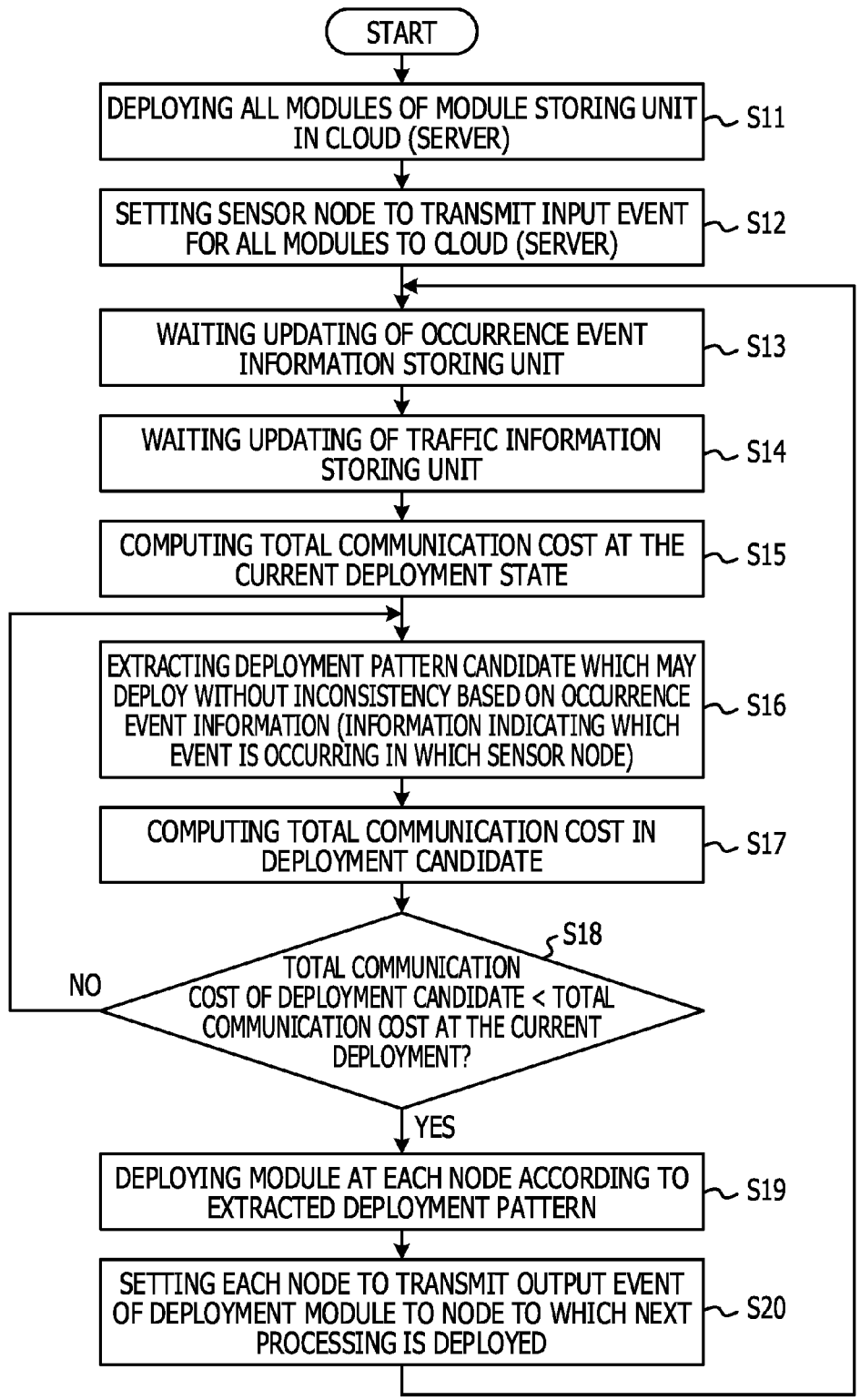
FIG. 11 is a view illustrating an example of an information gathering control.

FIG. 11 is a view illustrating an example of an information gathering control. For example, regarding any event, all the modules of the module storing unit 103 is deployed in the cloud (server) 100 (S11). The transmitting unit 106 transmits a set request to the terminal (temperature sensor) 20 to transmit input events to all the modules for the event to the cloud (server) 100 (S12). Next, updating of the occurrence event information storing unit 114 regarding the event is waited (S13). A case where the event information storing unit 114 is to be updated may include, for example, a case where the terminal (temperature sensor for a case of temperature event) 20 or the repeater (GW) 30 is newly installed or deleted, or a case where the newly occurred event (e.g., humidity event) is added.

Updating of the traffic information storing unit 112 is waited (S14). The traffic information may be an amount of communication traffic needed between the event modification processings. The amount of data output from a node per unit time regarding a certain node may differ according to a capability or event processing content of the node. The contents of the traffic information between the event modification processings is changed for a case where the terminal or repeater is added or deleted regarding a specific event or a new event is added.

When the occurrence event information storing unit 114 and the traffic information storing unit 112 are updated, the total communication cost at the current deployment state is computed (S15).

A deployment candidate is extracted which executes the processing flow defined based on the updated occurrence event information between the nodes without inconsistency (S16). In an extraction of the deployment candidate, for example, a node which is at the lowest side and accommodates all the nodes on which event occurred and having the same collection attribute value is retrieved in the network system 1 having the full-mesh connection topology.

The total communication cost of the shortest path in the deployment candidate is computed (S17) and the computed total communication cost is compared with the total communication cost at the current deployment (S18). When the total communication cost of the deployment candidate is greater than or equal to the total communication cost in the current deployment, the control process returns to S16 and the next deployment pattern candidate is extracted. When the total communication cost of the deployment candidate is less than the total communication cost at the current deployment, an effect of traffic reduction due to the distributed deployment is expected and thus, the distributed deployment is executed. For example, the module is deployed at each node (S19) according to the extracted deployment pattern and a transmission destination of the output event is notified to each node (S20). The control process returns to S13 and updating of the occurrence event information storing unit 114 is waited.

An optimum distributed deployment having the smallest total communication cost is performed with the network of full-mesh connection topology in the information gathering control illustrated in FIG. 11.

The server (cloud) 100 may have a functionality of the information gathering control (module distributed deployment control) or the repeater (GW) 30 may have the functionality. The GW 30 may be provided with the functionality of the deployment destination determination unit 119 in order to reference the traffic information which is managed by the traffic information management unit 152 of the server 100 and the network cost definition included in the network cost definition unit 115 to determine the deployment destination candidate and the optimum deployment.

The registration and management functionality (module management unit 155) of the module may be maintained in the server 100 so that a request to transmit the module to the determined deployment destination may be sent from the GW 30 to the server 100.

Figure 12:
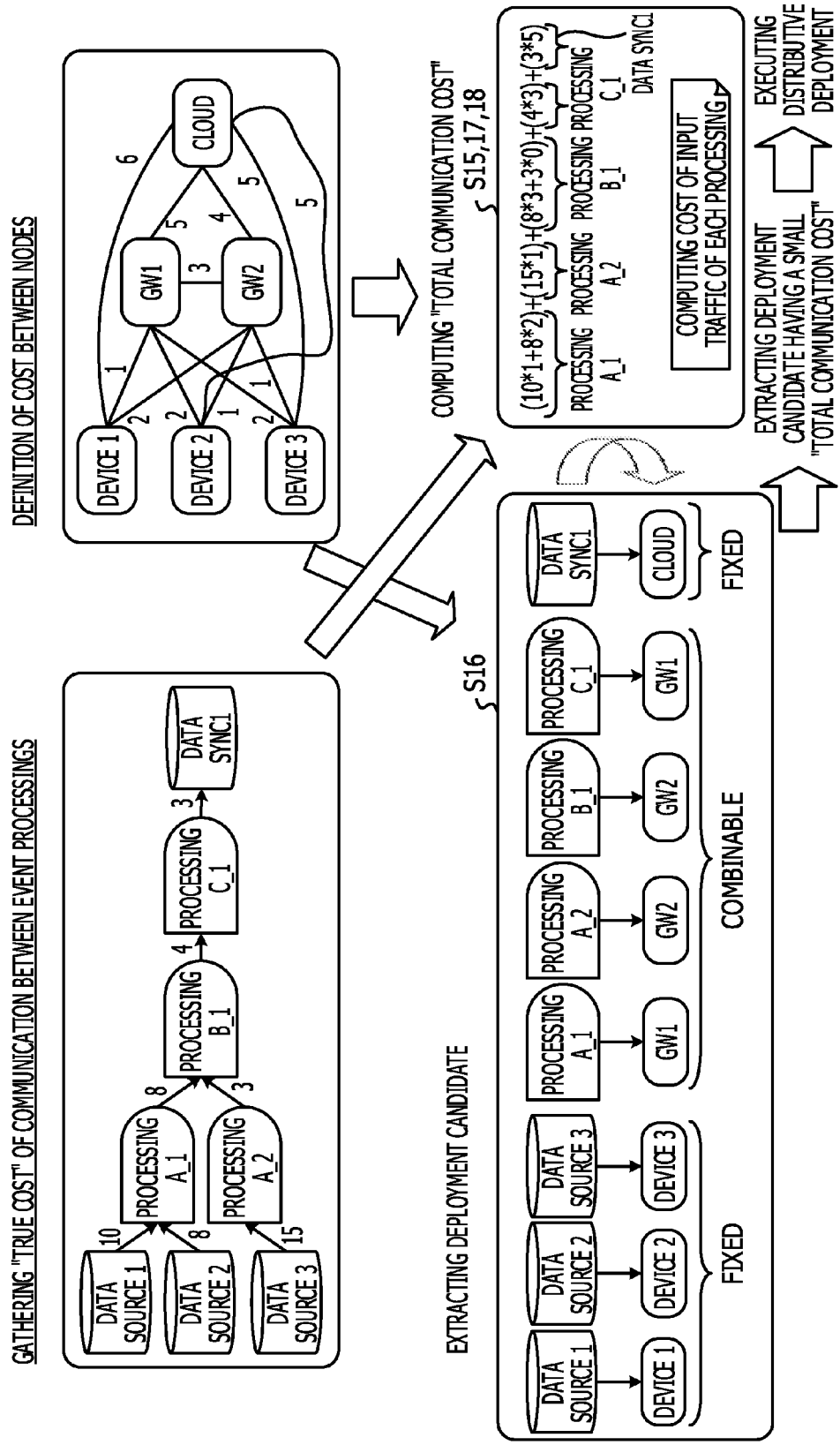
FIG. 12 is a view illustrating an example of an information gathering control.

FIG. 12 is a view illustrating an example of an information gathering control. FIG. 12 illustrates an example of a deployment pattern. In a network including the GW-1 and the GW-2, a deployment pattern in which the processing A_1 is performed at the GW-1, the processing A_2 is performed at the GW-2, the processing B_1 is performed at the GW-2 and the processing C_1 is performed at the GW-1, is extracted as a deployment candidate of a module (S16). In this case, the total costs of communication of the current deployment pattern and the deployment pattern candidate are computed in the shortest path (a path having the lowest cost between nodes) (S15, S17). The total costs of both deployment patterns are compared with each other so that the deployment patterns having the lower total communication cost is selected (S18). Therefore, an effect of traffic suppression may be increased for a case where the information gathering processing is performed in the mesh network.

Figure 13:
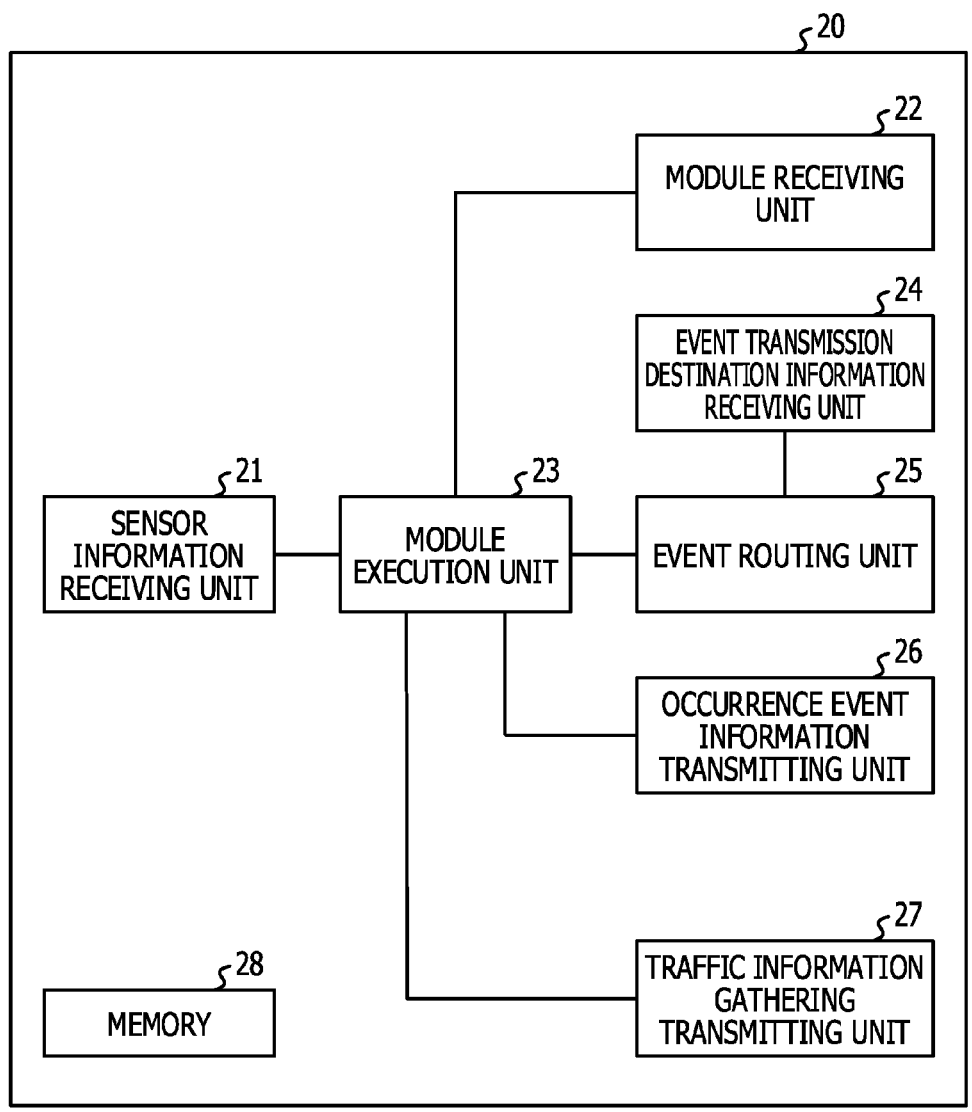
FIG. 13 is a view illustrating an example of sensor node.

FIG. 13 is a view illustrating an example of a sensor node. In FIG. 13, the functional blocks of the sensor node used in the system illustrated in FIG. 1 are illustrated. For example, the terminal 20 illustrated in FIG. 13 may correspond to the terminal 20 illustrated in FIG. 1. The sensor information receiving unit 21 receives the sensor information from a sensor incorporated in the terminal 20. For example, when the sensor device is a temperature sensor, the sensor information receiving unit 21 may receive the temperature information. The module receiving unit 22 receives a module from the server 100. An output of the module receiving unit 22 is coupled to an input of the module execution unit 23. The module execution unit 23 executes the received module to generate an output event. For example, when the module is an application which computes a daily average temperature of temperatures detected in the terminal 20, the temperature information supplied from the sensor information receiving unit 21 may be modified so that the daily average temperature is output as an output event. When the module is not deployed in the terminal 20, the output of the sensor information receiving unit 21 may be directly coupled to the event routing unit 25.

The event routing table receiving unit 24 receives the information of the forwarding node to which the event occurring in the terminal 20 is transmitted, and sets the information of the forwarding node in the event routing unit 25. The event routing unit 25 transmits the occurred event based on the routing table.

The occurrence event information transmitting unit 26 gathers information of an input event to the module execution unit 23 or an output event which is the processing result of the module execution unit 23 and transmits the information of the input event and the output event to the server 100. The traffic information gathering and transmitting unit 27 gathers the traffic of the output event which is the processing result of the module execution unit 23 and transmits the gathered traffic to the traffic receiving unit 111 of the server 100. A central processing unit (CPU) may include some or all of units of the sensor node 20 illustrated in FIG. 13. For example, the CPU may execute an information processing program stored in the memory 28 so that the processing by the sensor node 20, which has been described above, may be executed.

Figure 14:
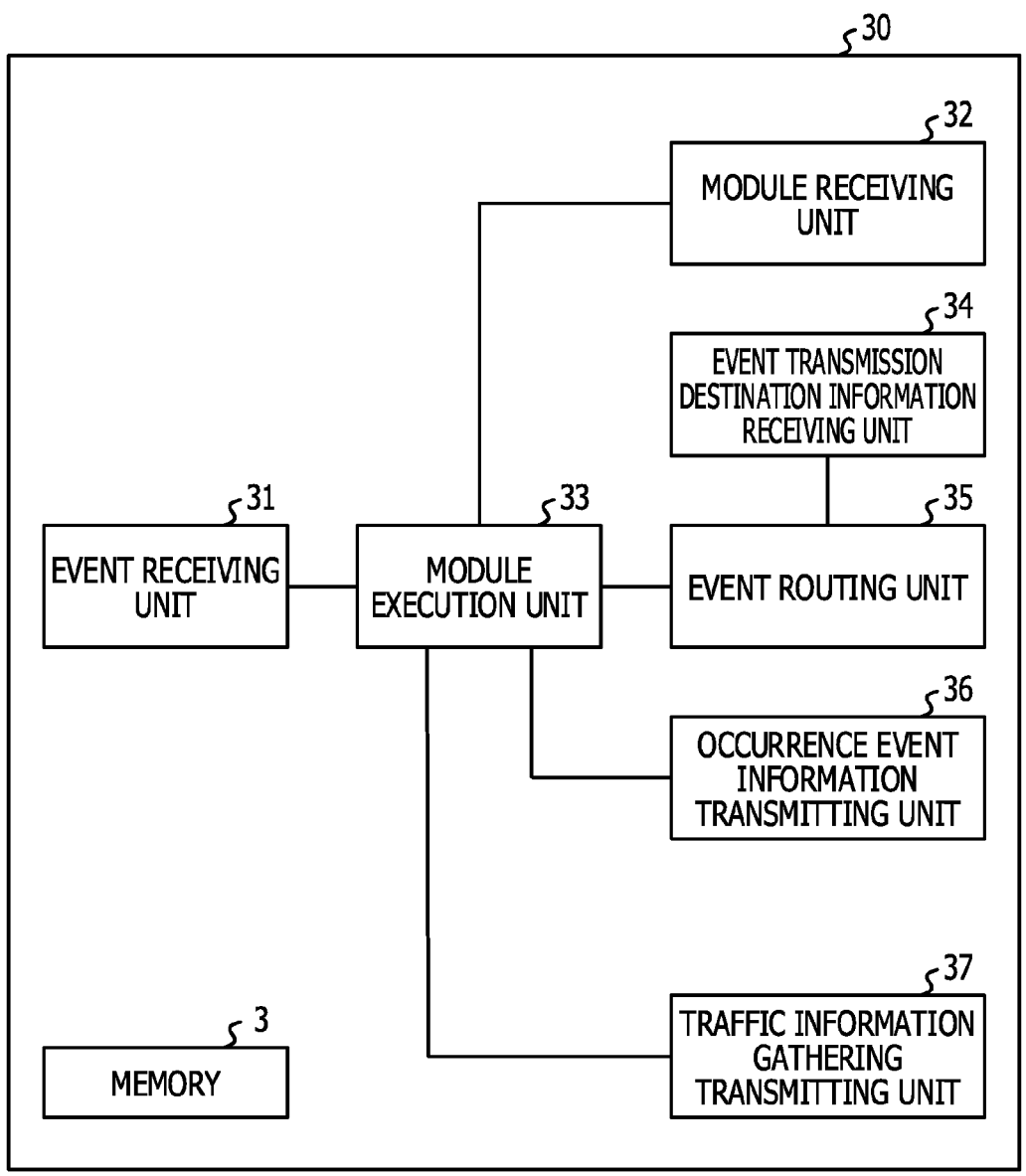
FIG. 14 is a view illustrating an example of relay node.

FIG. 14 is a view illustrating an example of a relay node. FIG. 14 illustrates the relay node used in the system illustrated in FIG. 1. A repeater (GW) 30 illustrated in FIG. 14 may correspond to the repeater 30 illustrated in FIG. 1. The event receiving unit 31 receives an event from the terminal 20 which is the lower node, or other GW 30. The module receiving unit 32 receives the module from the server 100 and outputs the received module to the module execution unit 33.

The module execution unit 33 executes the deployed module and outputs the processing result to the event routing unit 35 as the output event. For example, when the module is not deployed, the module execution unit 33 may directly output the event received at the event receiving unit 31 to the event routing unit 35.

The event routing table receiving unit 34 receives information of the forwarding node to which the event received in the event receiving unit 31 or the output event output from the module execution unit 33 is transmitted to set the received information in the event routing unit 35. The event routing unit 35 transmits the received event or the occurred output event based on the routing table.

The occurrence event information transmitting unit 36 gathers information of an input event to the module execution unit 33 or an output event which is the processing result of the module execution unit 33, and transmits the information to the server 100. The traffic information gathering and transmitting unit 37 gathers the traffic of the output event which is the processing result of the module execution unit 33 and transmits the gathered traffic to the traffic receiving unit 111 of the server 100. The central processing unit (CPU) may include some or all of respective units of the sensor node 30 illustrated in FIG. 14. For example, the CPU may execute an information processing program stored in the memory 38 so that the processing by the relay node 30, which has been described above, may be executed.

As described above, the communication cost (cost between nodes) between all the nodes included in the mesh network and the communication traffic (true cost) needed between the respective event modification processings included in a series of the event processings become the basis of the cost computation, so that the total communication cost is calculated for a case where the shortest path is employed. The total communication cost in the module deployment pattern at the current state is compared with the total communication cost for a case where some of processings (modules) are transferred to the deployment destination candidate to determine whether the execution of distributed deployment is needed or not. With the configuration described above, the module may be distributively deployed to another node included in a path selected as having the smallest cost by the shortest path search thereby suppressing the increase of the traffic.

The control processing described above may be performed by the server 100 or the GW 30. The control processing may be executed by a control processing program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An event gathering method comprising:
storing cost information between nodes which manages by associating a transmission node identifier, which identifies a transmission source node of a communication with a reception destination node, and a reception node identifier, which identifies the reception destination node, with a first communication cost between the transmission source node and the reception destination node, the communication occurring between nodes including a sensor node which transmits an event and an intermediate node which relays the event;
modifying or storing the event in a process which gathers the event from the network;
gathering cost information between modules which manages by associating a transmission module identifier, which identifies a transmission source module, and a reception module identifier, which identifies a reception destination module, with a second communication cost of a occurred event, the occurred event occurring between the transmission source module and the reception destination module in the modifying or the storing;
extracting a pattern candidate which assigns one or more modules to one or more first nodes included in the sensor network as a plurality of deployment pattern candidates which manages by associating a module identifier, which identifies the module, with a node identifier which identifies the first node;

computing a total communication cost based on the cost information between modules and the cost information between nodes regarding each of the plurality of deployment pattern candidates;

selecting a deployment pattern candidate having the smallest total communication cost from among the plurality of deployment pattern candidates; and deploying the one or more modules in the one or more first nodes based on a selected deployment pattern candidate.

2. The event gathering method according to claim 1, wherein the first communication cost is a communication cost per unit amount of communication, and the second communication cost is an amount of communication occurring between the modules.

3. The event gathering method according to claim 1, wherein the first communication cost is a communication cost per unit time, and the second communication cost is a communication time of communication occurring between the modules.

4. The event gathering method according to claim 1, wherein the first node of the module is fixed to a second node in the extracting the deployment pattern candidates.

5. An information processing apparatus comprising:

a CPU configured to execute an information processing program; and a memory configured to store the information processing program, wherein the program causes the CPU to perform operations of:

storing cost information between nodes which manages by associating a transmission node identifier, which identifies a transmission source node of a communication with a reception destination node, and a reception node identifier, which identifies the reception destination node, with a first communication cost between the transmission source node and the reception destination node, the communication occurring between nodes including a sensor node which transmits an event and an intermediate node which relays the event;

modifying or storing the event in a process which gathers the event from the network;

gathering cost information between modules which manages by associating a transmission module identifier, which identifies a transmission source module, and a reception module identifier, which identifies a reception destination module, with a second communication cost of a occurred event, the occurred event occurring between the transmission source module and the reception destination module in the modifying or the storing;

extracting a pattern candidate which assigns one or more modules to one or mode first nodes included in the sensor network as a plurality of deployment pattern candidates which manages by associating an module identifier which identifies the module with a node identifier which identifies the first node;

computing a total communication cost based on the cost information between modules and the cost information between nodes regarding each of the plurality of deployment pattern candidates;

selecting a deployment pattern candidate having the smallest total communication cost from among the plurality of deployment pattern candidates; and deploying the one or more modules in the one or more first nodes based on the selected deployment pattern candidate.

6. The information processing apparatus according to claim 5, wherein the first communication cost is a communication cost per unit amount of communication, and the second communication cost is an amount of communication occurring between the modules.

7. The information processing apparatus according to claim 5, wherein the first communication cost is a communication cost per unit time, and the second communication cost is a communication time of communication occurring between the modules.

8. The information processing apparatus according to claim 5, wherein the first node of the module is fixed to a second node in the extracting the deployment pattern candidates.

9. An event gathering system comprising:

a server coupled to a network system including a plurality of nodes including a sensor node which transmits an event and an intermediate node which relays the event, wherein the server is configured to:

store cost information between nodes which manages by associating a transmission node identifier which identifies a transmission source node of a communication with a reception destination node, and a reception node identifier which identifies the reception destination node with a first communication cost between the transmission source node and the reception destination node;

gather cost information between modules which manages by associating a transmission module identifier, which identifies a transmission source module, and a reception module identifier, which identifies a reception destination module, with a second communication cost of a occurred event, the occurred event occurring between the transmission source module and the reception destination module in the modifying or the storing;

extract a pattern candidate which assigns one or more modules to one or more first nodes included in the sensor network as a plurality of deployment pattern candidates which manages by associating an module identifier which identifies the module with a node identifier which identifies the first node;

compute a total communication costs based on the cost information between modules and the cost information between nodes regarding each of the plurality of deployment pattern candidates;

select a deployment pattern candidate having the smallest total communication cost from among the plurality of deployment pattern candidates; and deploy the one or more modules in the one or more first nodes based on the selected deployment pattern candidate.

10. The event gathering system according to claim 9, wherein the first communication cost is a communication cost per unit amount of communication, and the second communication cost is an amount of communication occurring between the modules.

11. The event gathering system according to claim 9, wherein the first communication cost is a communication cost per unit time, and the second communication cost is a communication time of communication occurring between the modules.

12. The event gathering system according to claim 9, wherein the first node of the module is fixed to a second node in the extracting the deployment pattern candidates.

* * * * *